United States Patent [19]
Jackson et al.

[11] Patent Number: 5,456,957
[45] Date of Patent: Oct. 10, 1995

[54] BODY SIDE MOLDING AND METHOD

[75] Inventors: Norman C. Jackson, Livonia; Jack V. Henderson, Bloomfield Hills; Heinz Angerstein, Farmington Hills, all of Mich.

[73] Assignee: The Standard Products Company, Cleveland, Ohio

[21] Appl. No.: 846,825

[22] Filed: Mar. 6, 1992

[51] Int. Cl.[6] .................................................. B32B 9/00
[52] U.S. Cl. .................................. 428/31; 428/67; 428/99; 428/121; 428/159; 428/172; 428/187; 428/319.7; 293/1; 293/128; 264/259; 264/271.1; 264/274; 156/244.12; 156/245
[58] Field of Search ........................ 428/67, 121, 159, 428/319.7, 31, 122, 187, 99, 172, 358; 156/244.12, 245; 293/1, 128; 264/259, 271.1, 274

[56] References Cited

U.S. PATENT DOCUMENTS

| | | | |
|---|---|---|---|
| 2,290,249 | 7/1942 | Piperoux | 18/55 |
| 3,245,864 | 4/1966 | Shanok et al. | 161/406 |
| 3,451,709 | 6/1969 | Sqauger | 293/1 |
| 3,458,386 | 7/1969 | Shanok et al. | 161/221 |
| 3,969,172 | 7/1976 | Hotton | 156/211 |
| 3,970,498 | 7/1976 | Loew | 156/211 |
| 4,029,454 | 6/1977 | Monnet | 425/130 |
| 4,043,740 | 8/1977 | Gellert | 425/567 |
| 4,052,522 | 10/1977 | Narita | 428/31 |
| 4,061,705 | 12/1977 | Marcus | 264/89 |
| 4,094,056 | 6/1978 | Takeda et al. | 29/527 |
| 4,101,617 | 7/1978 | Friederich | 425/544 |
| 4,104,353 | 8/1978 | Monnet | 264/255 |
| 4,106,887 | 8/1978 | Yasuike et al. | 425/549 |
| 4,120,628 | 10/1978 | Simos | 125/131.1 |
| 4,140,470 | 2/1979 | Pasche et al. | 425/544 |
| 4,140,672 | 2/1979 | Kataoka | 264/45.1 |
| 4,146,081 | 3/1979 | Reis | 164/155 |
| 4,201,742 | 5/1980 | Hendry | 264/45.5 |
| 4,208,177 | 6/1980 | Allen | 425/404 |
| 4,212,787 | 7/1980 | Matsuda et al. | 360/33.6 |
| 4,246,303 | 1/1981 | Townsend | 428/31 |
| 4,247,515 | 1/1981 | Olabisi | 264/500 |
| 4,277,526 | 7/1981 | Jackson | 428/31 |
| 4,298,640 | 11/1981 | Katoh | 428/31 |
| 4,304,542 | 12/1981 | Sauer | 425/523 |
| 4,318,764 | 3/1982 | Van Manen | 156/244.11 |
| 4,340,990 | 7/1982 | Seynhaeve | 16/126 |
| 4,389,358 | 6/1983 | Hendry | 264/45.1 |
| 4,390,332 | 6/1983 | Hendry | 425/4 R |
| 4,390,486 | 6/1983 | Hendry et al. | 264/45.5 |
| 4,422,840 | 12/1983 | Posch et al. | 425/472 |
| 4,462,780 | 7/1984 | Stavitsky et al. | 425/144 |
| 4,472,131 | 9/1984 | Ryder | 425/548 |
| 4,474,717 | 10/1984 | Hendry | 264/45.5 |
| 4,479,914 | 10/1984 | Baumrucker | 264/45.5 |
| 4,482,515 | 11/1984 | Buhler et al. | 264/102 |

(List continued on next page.)

FOREIGN PATENT DOCUMENTS

| | | |
|---|---|---|
| 0061132 | 9/1982 | European Pat. Off. . |
| 60-47742 | 3/1985 | Japan . |

(List continued on next page.)

Primary Examiner—Patrick J. Ryan
Assistant Examiner—Abraham Bahta
Attorney, Agent, or Firm—Harness, Dickey & Pierce

[57] ABSTRACT

This invention relates to a method for molding composite automotive trim members having a layer of a first material and a backing member made of a second thermoplastic material. The first material is introduced to the mold in the form of an elastic sheet having a show surface. This sheet is placed in the mold and the second thermoplastic material is subsequently injected into the mold cavity. This causes the second thermoplastic material to bond to one side of the sheet and forces the show surface on the opposite side of the sheet into abutting engagement with the mold surface, thereby creating the trim member. The second thermoplastic material forms a backing member that provides structural support for the sheet. The sheet forms an outer layer for the trim member. Note that the show surface on the sheet remains intact during and after injection and therefore provides a show surface for the trim member.

15 Claims, 3 Drawing Sheets

U.S. PATENT DOCUMENTS

| | | | |
|---|---|---|---|
| 4,497,763 | 2/1985 | Monnet | 264/255 |
| 4,498,860 | 2/1985 | Gahan | 425/962 |
| 4,501,549 | 2/1985 | Abramov et al. | 425/542 |
| 4,515,649 | 5/1985 | Nussbaum | 156/244.11 |
| 4,546,022 | 10/1985 | Madonia et al. | 428/31 |
| 4,555,225 | 11/1985 | Hendry | 425/4 R |
| 4,600,461 | 7/1986 | Guy | 156/244 |
| 4,601,870 | 7/1986 | Sasaki | 264/572 |
| 4,647,274 | 3/1987 | Oda | 425/135 |
| 4,653,997 | 3/1987 | Sheffield et al. | 425/556 |
| 4,654,238 | 3/1987 | Yamazaki et al. | 428/31 |
| 4,675,141 | 6/1987 | Kumazaki | 264/40.3 |
| 4,714,423 | 12/1987 | Hattori et al. | 425/379 |
| 4,734,243 | 3/1988 | Kohama et al. | 264/328 |
| 4,740,150 | 4/1988 | Sayer | 425/542 |
| 4,750,877 | 6/1988 | McFarlane | 425/573 |
| 4,778,550 | 10/1988 | Barton et al. | 156/211 |
| 4,779,667 | 10/1988 | Fujino et al. | 164/305 |
| 4,781,554 | 11/1988 | Hendry | 425/5 R |
| 4,797,236 | 1/1989 | Kojima | 264/40.1 |
| 4,808,450 | 2/1989 | Guy | 428/31 |
| 4,824,732 | 4/1989 | Hendry et al. | 428/542 |
| 4,830,804 | 5/1989 | Weaver | 264/139 |
| 4,830,812 | 5/1989 | Kauer | 264/572 |
| 4,838,338 | 6/1989 | Priem | 164/113 |
| 4,855,094 | 8/1989 | Hendry | 264/40.3 |
| 4,911,959 | 3/1990 | Miyakawa | 428/31 |
| 4,913,644 | 4/1990 | Kauer | 425/522 |
| 4,917,594 | 4/1990 | Gellert et al. | 425/549.1 |
| 4,923,666 | 5/1990 | Yamazaki et al. | 264/572 |
| 4,923,667 | 5/1990 | Sayer | 264/572 |
| 4,935,191 | 6/1990 | Baxi | 264/572 |
| 4,942,006 | 7/1990 | Loren | 264/50 |
| 4,943,407 | 7/1990 | Hendry | 264/572 |
| 4,944,910 | 7/1990 | Hendry | 264/572 |
| 4,948,547 | 8/1990 | Hendry | 264/500 |
| 4,957,682 | 9/1990 | Kobayashi et al. | 264/288 |
| 4,978,490 | 12/1990 | Jackson | 264/148 |

FOREIGN PATENT DOCUMENTS

| | | |
|---|---|---|
| 0061132 | 9/1982 | European Pat. Off. . |
| 60-47742 | 3/1985 | Japan . |
| 1279846 | 6/1972 | United Kingdom . |
| 1428812 | 3/1976 | United Kingdom . |
| 1428811 | 3/1976 | United Kingdom . |
| 1545511 | 5/1979 | United Kingdom . |
| 2097710 | 11/1982 | United Kingdom . |
| 2124968 | 2/1984 | United Kingdom . |
| 2139548 | 11/1984 | United Kingdom . |
| 2158002 | 11/1985 | United Kingdom . |

BODY SIDE MOLDING AND METHOD

BACKGROUND OF THE INVENTION

This invention relates generally to automotive trim members and more particularly to methods for injection molding automotive trim members. Conventionally molded automotive trim members are typically made utilizing one of two processes. In one process, an extruded core is inserted into the mold cavity and a pigmented resin is injected around it. The injected resin fills the cavity to create a molded trim member having the desired color and surface texture. Another common process involves molding the entire trim member first and subsequently painting the trim member. Both of these processes are relatively inefficient since two separate steps are utilized to mold a support member and thereafter apply a show surface. There are also disadvantages pertaining to quality of appearance and ease of manufacture of parts made by such processes. For example, one disadvantage of inserting a core member into a mold and injecting pigmented resin around it is that the pigmented resin may not flow properly through the mold, causing discontinuities in coloring such as swirls, streaks or the like. Another disadvantage is that when liquid resin comes in contact with surfaces forming the mold cavity or with seams in a mold cavity, imperfections are formed on the exterior surface of the trim member giving it a poor appearance. An additional disadvantage includes having to place end caps on the ends of the trim members to conceal discontinuities which occur at the end portions of the trim member.

With regard to painting a molded member, paint can be unevenly distributed over the extrusion surface. Paint is easily chipped and scratched, and subject to tearing if the trim member is dented, twisted, bent or otherwise deflected. These types of members are typically solid, and therefore are heavier, and tend to have a sink problem when there are thick cross sections that cool unevenly. Thus, it is desirable to provide an automotive trim member having a backing or core member with an outer layer that provides a show surface. It is also desirable to produce this trim member with a single injection process. Furthermore, it is desirable to reduce the mass of the trim member and to reduce mold pressure during the molding process.

SUMMARY OF THE INVENTION

The present invention relates to methods for molding composite trim members for automotive vehicles. These trim members have a thermoplastic backing member and an outer layer with two sides. One side of the outer layer is attached to the backing member, and a second side provides a show surface for the trim member. The trim member of the present invention is created in a one step process where a sheet of material having a show surface is placed into the mold and a polymer is injected behind the sheet. The polymer fills the mold and bonds to the sheet, causing the show surface to contact and assume the shape of the mold. The polymer is then cooled causing the polymer to form the backing member and the sheet to form the outer layer.

Thus, one advantage of the present invention is that a show surface, that is color matched and has the requisite surface qualities, remains intact during and after molding and therefore can be qualitatively selected prior to the molding process.

Another advantage of the present invention is that highly polished mold cavity surfaces are not necessary to avoid imperfections on the finished exterior surface of the trim member. Accordingly, inserts may be added into the mold cavity, thereby creating seams in the mold cavity surfaces, without causing imperfections on the finished exterior surface of the trim member. Therefore, molds can be adapted to accommodate inserts for mounting therein, thereby allowing one mold to simultaneously create a variety of variously shaped trim members.

Yet another advantage of the present invention is the ability to mold different color trim members in consecutive molding operations without cleaning the injection system. Since only one type of resin is injected behind different colored sheets, in the present invention, color changes are immediate, whereas existing systems that inject pigmented resin take up to one hour of cleaning time, thereby taking away from valuable production time.

A further advantage of the present invention is that the sheet which forms the outer layer is resilient thereby enhancing the durability of the trim member.

A still further advantage is the use of a gas assist process where gas is injected into the mold, thereby reducing mold clamping pressure while simultaneously creating cavities in the trim member to reduce mass.

Additional objects, advantages, and features of the present invention will become apparent from the following description and appended claims, taken in conjunction with the accompanying drawings.

DETAILED DESCRIPTION OF THE PREFERRED EMBODIMENT

Figure 1:
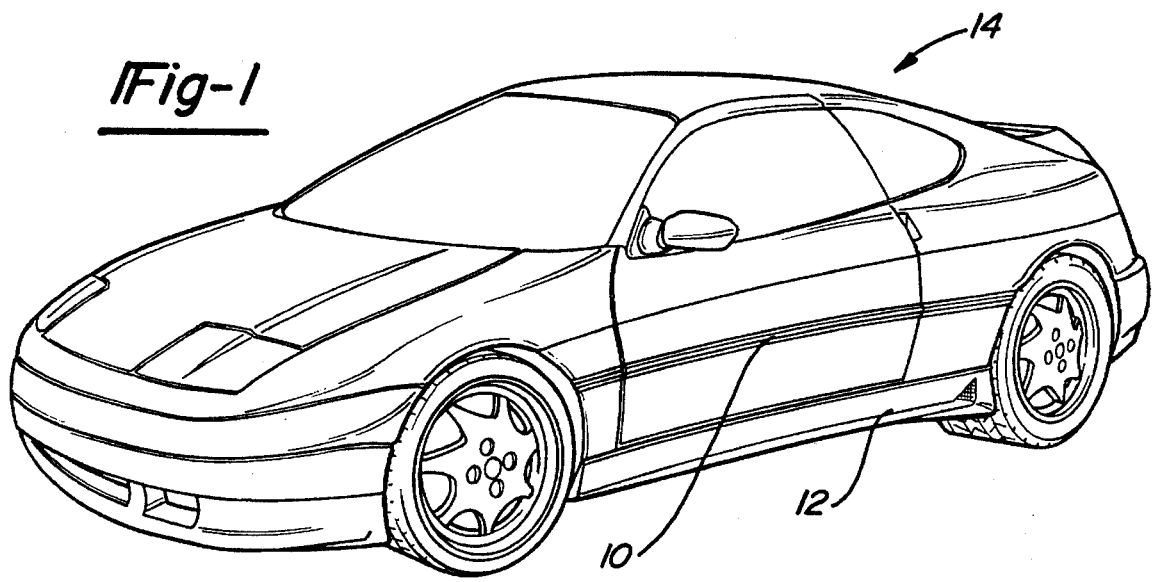
FIG. 1 is a perspective view of a vehicle utilizing trim members in accordance with the principles of the present invention.
Figure 2:
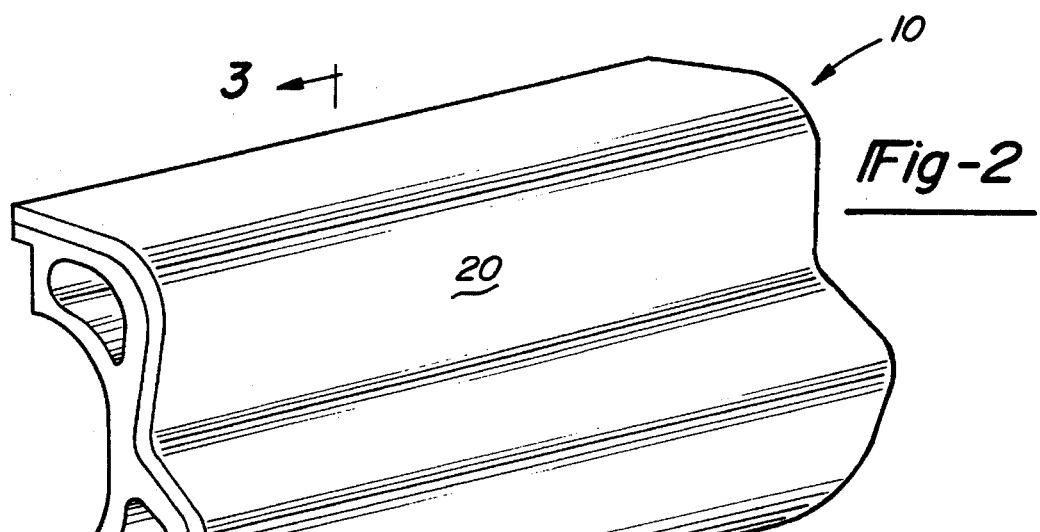
FIG. 2 is a perspective view of a trim member of the present invention.
Figure 3:
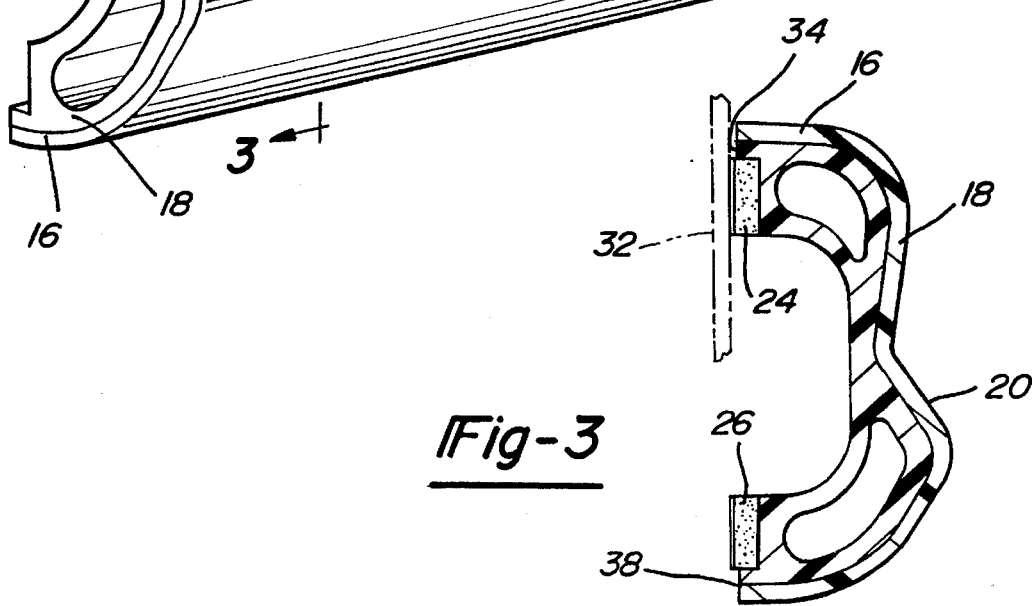
FIG. 3 is a transverse cross sectional view taken along section 3—3 in FIG. 2 showing a layer of thermoplastic material molded to a cored out backing member.

Referring now to the drawings, and in particular FIG. 1, a body side molding trim member 10 and a cladding trim member 12 are shown affixed to an automotive vehicle 14. FIGS. 2 and 3 further illustrate one embodiment of a body side molding 10 that has an exterior layer 16 which has been bonded to a molded backing member 18. The backing member 18 provides structural integrity to the trim member while the exterior layer 16 provides a show surface 20 for the trim member. These figures also illustrate that the backing member 18 is cored which is a result of injecting gas into the mold (not shown) during the molding process as will be discussed, infra, in more detail.

The outer layer 16, preferably made of thermoplastic material, is initially a conventionally extruded sheet (not shown) that is processed with a conventional three stack collandering process. Prior to molding, one side of the sheet has a desired show surface 20 that can be color matched to the vehicle 14 and has a smoothness as specified for the particular trim member. This sheet is generally flexible, elastic and resilient, permitting it to stretch in the mold, and is seamless such that the entire show surface 20 of the trim member is continuous. The sheet of thermoplastic material is preferably made of a polyvinyl chloride in the range of shore "A" hardness of 80 to 95 durometer, 15 second delay; however, other types of thermoplastic sheets may be utilized. Pigmented resin films such as Fluorex made by Rexham of Matthews, N.C. may also be utilized, provided they have a suitable elasticity to be deformed into a suitable molding contour or the like. Prior to molding, the sheets made of polyvinyl chloride are preferably from about 30 to 35 thousandths of an inch thick. The thickness selected must be sufficient to provide ample material for stretching and deforming during the molding process and also provide enough thickness such that the color of the backing member 18 will not show through.

The sheet is bonded to the backing member 18 during molding when the sheet is placed in the mold and a second reinforced thermoplastic material is injected into the mold. Preferably, this second material is a polyvinyl chloride that contains approximately 15 percent reinforcement material having the tradename Fiberloc which can be acquired from B. F. Goodrich Corporation of Avon Lake, Ohio. Other materials such as thermoplastic urethane, polyvinyl chloride and thermoplastic olefins, and reinforcing materials such as mica, talc, lineal fibers, fiberglass, calcium carbonate, glass beads or the like, can also be utilized. The second thermoplastic material bonds to the side of the sheet that does not provide the show surface 20 for the finished trim member, thereby creating the trim member. As best illustrated by the trim members in FIGS. 2–6, the injected material forms the backing member 18, which provides for the shape and structural support of the trim member. Once the backing member 18 is molded, the sheet is merely an outer layer 16 that provides a show surface 20 to the trim member. This outer layer 16 in combination with the backing member 18 is resilient and therefore does not chip or crack when the trim member is bent, twisted or dented. In addition, the show surface 20 may be enhanced by the addition of a decorative member 22 attached to the show surface 20', as shown in FIG. 5. Such decorative members are of a wide variety and include members made from thermoplastically coated metallized polyester film and the like.

Figure 6:
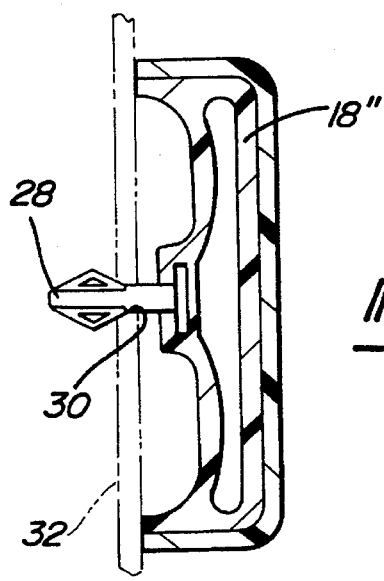
FIG. 6 is a cross sectional view similar to FIG. 3 illustrating one embodiment of a mechanical attaching device extending from the backing member in accordance with the principles of the present invention, for attaching the trim member to a vehicle.

The backing member 18 also serves the purpose of providing accommodations for attaching devices that attach the trim members to the vehicle 14. FIG. 3 illustrates ledges 24 on the backing member 18 to which double sided strips of tape 26 attach for adhering the trim member to the vehicle 14. FIG. 6 illustrates a mechanical attaching device 28 that is integrally molded into the backing member 18" such that it extends outwardly therefrom. This mechanical attaching device 28 is inserted into a receptacle 30, or the like, on the vehicle outer skin 32 thereby retaining the trim member on the vehicle 14. Although a dart type mechanical attaching device 28 is shown in FIG. 6, one of ordinary skill in the art would recognize that numerous other mechanical attaching devices could be utilized. Moreover, these mechanical attaching devices do not necessarily have to be molded directly into the backing member 18". For example, attaching devices may be adhered, bonded or removably attached to the backing member 18".

Figure 4:
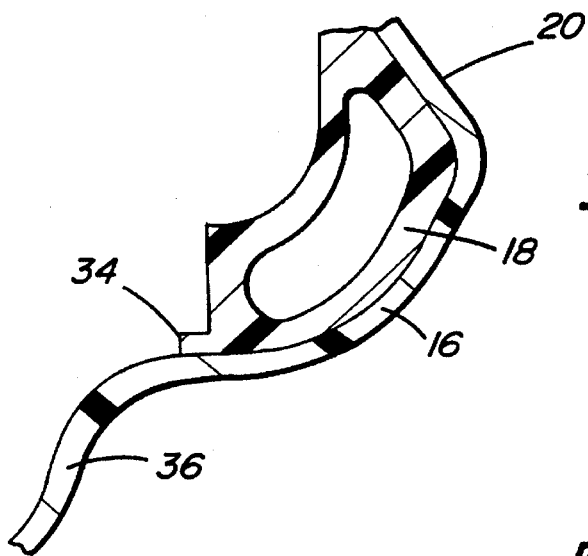
FIG. 4 illustrates a portion of a transverse cross section similar to FIG. 3 showing a lip portion extending from an edge of the trim member, with a portion of the thermoplastic sheet extending beyond the lip portion prior to its removal.
Figure 5:
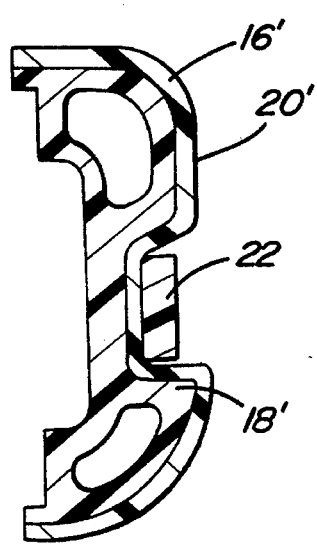
FIG. 5 is a cross sectional view similar to FIG. 3 illustrating a trim member of the present invention having a decorative strip fixedly attached to the sheet of thermoplastic material, thereby enhancing the show surface.

As best illustrated in the embodiment shown in FIGS. 3 and 4, the backing member 18 and the outer layer 16 combine to form a lip 34. This lip 34 extends from the main portion of the body member 18 toward a surface of the vehicle 32 adjacent the trim member. This lip 34 is created by forming a lip on the backing member 18 during the molding process and by molding the trim member such that an extra portion 36 of the sheet abuts, and extends beyond, the lip 34. By providing this lip 34, any extra sheet material can be precisely removed by cutting, milling, grinding, or the like, leaving a finished edge surface 38 along the lip 34. Preferably, a Model 82ES router produced by Thermwood Corporation of Dale, Ind. is utilized. Once the extra portion 36 is removed, as shown in FIG. 3, the lip 34 extends the show surface 20 of the outer layer 16 closer to the adjacent vehicle surface 32. This conceals a major portion of the double-sided tape 26 which holds the trim member on the vehicle surface. Note that the double-sided tape 26 should extend slightly beyond the lip 34 so that the lip 34 does not interfere with the engagement of the tape 26 and the vehicle surface.

Figure 7:
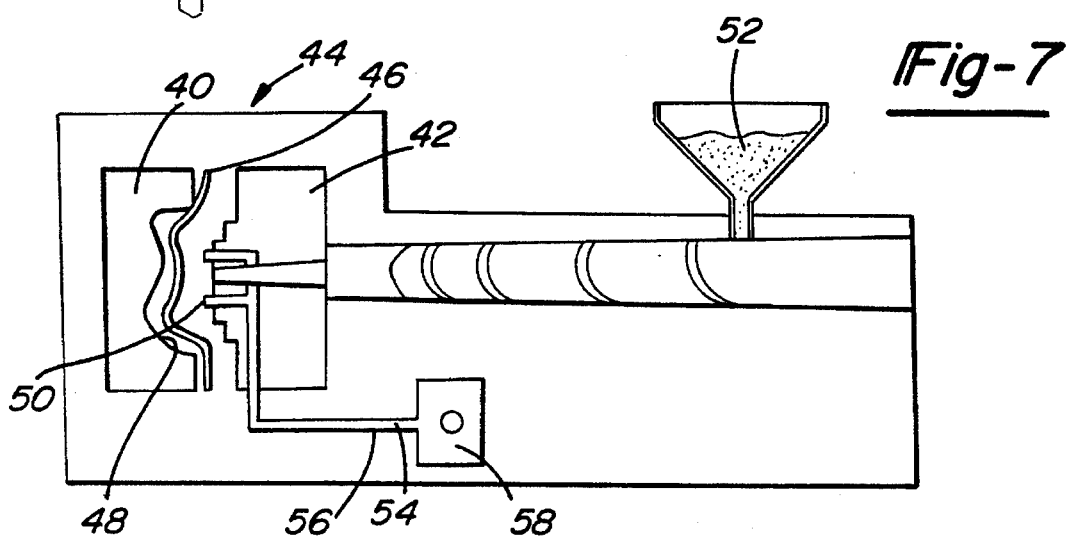
FIG. 7 is a diagrammatic cross sectional view of an injection molding machine illustrating a sheet of thermoplastic material being placed in a mold such that its show surface is generally adjacent to an interior surface of the mold cavity prior to closing the mold.
Figure 8:
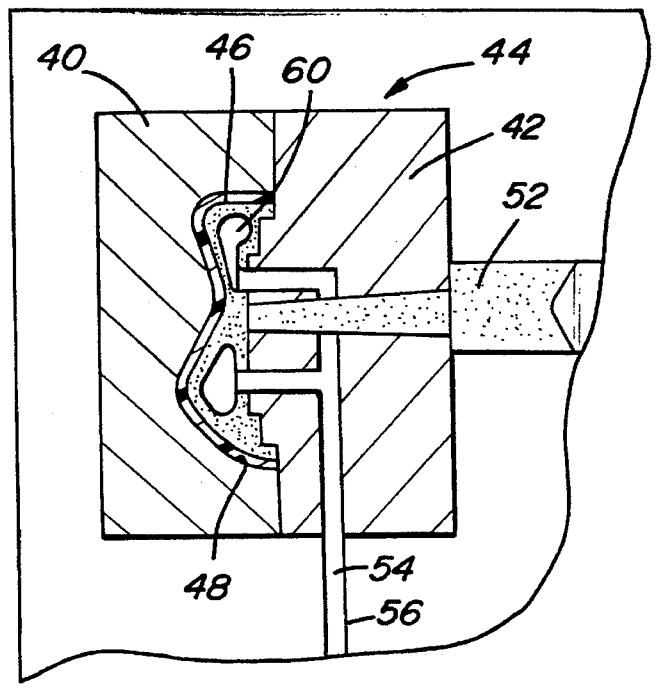
FIG. 8 is a diagrammatic cross sectional view similar to a portion of FIG. 7 illustrating the mold in a closed position with thermoplastic material and gas injected into the mold cavity, thereby filling the cavity and forcing the thermoplastic sheet against an inner surface of the mold cavity in accordance with the principles of the present invention.

The above described trim members are molded in a unique molding process that greatly simplifies the manufacturing of trim members and enhances their quality. As best shown in FIGS. 7 and 8, this method involves placing a continuous sheet 46 of material between first and second portions 40 and 42 of a mold 44 at room temperature. The sheet 46 is oriented so that a show surface 20 on the sheet 46 is adjacent to a surface 48 in the mold cavity 50 that defines the finished contour of the trim member. The mold 44 is then closed, with the sheet 46 trapped between the first and second portions 40 and 42 of the mold, and clamping pressure is applied to hold the first and second portions 40 and 42 together. Finally, both a thermoplastic polymer material 52 and a gas 54 are injected into the mold cavity 50. By injecting thermoplastic polymer material 52 and gas 54 into the mold cavity 50, behind the sheet 46, the sheet 46 is forced into abutting engagement with mold surface 48. As the mold cavity 50 is filled, the sheet 46 and the polymer material 52 assume the shape of the mold 44, and bond to one another in the process. At this stage, the sheet 46 is sandwiched between the polymer material 52 and the mold cavity surface 48. The polymer material 52 and the sheet 46 are subsequently cooled, thereby forming the backing member 18 and the continuous outer layer 16 of the body side molding shown in FIG. 3.

One novel aspect of this process is that the show surface 20 on the sheet 46 is maintained from start to finish. In other words, the show surface 20 existing on the sheet 46, prior to molding, is transferred onto the trim member. This show surface 20 is unaffected by pressure or heat in the molding process and remains unchanged throughout. Thus, the desired color and surface finish for a particular trim member can be selected prior to molding that trim member. This allows for precise color matching of trim members to vehicles 14 before the trim members are produced. Moreover, since the color is imparted onto the trim member by the sheet 46, and only one polymer material 52 is used, different colored trim members can be created in consecutive molding operations without cleaning the injector.

The show surface 20 remains unaffected during the molding process due to the injection of gas 54 into the mold cavity 50 by a gas assist process. As stated above, in a preferred embodiment of the present invention, a gas injection molding process is utilized in the injection molding step of the present invention. Gas assist processes are shown in U.S. Pat. Nos. 4,824,732; 4,740,150; 4,998,860; and 4,101,617 which are hereby incorporated by reference herein. As illustrated in FIGS. 7 and 8, gas 54 is injected into the mold 44 via transport ducts 56 that lead from a gas supply source 58 that preferably supplies nitrogen, although other gases may be utilized. Once a sufficient quantity of thermoplastic polymer material 52 is injected into the mold 44, gas 54 is injected into this material 52, creating internal cavities 60 within the polymer material 52 which reduces the mass of the trim member. By injecting gas 54 in to the polymer material 52, the pressure upon the material 52 is enhanced and the material 52 is forced outwardly toward the outer surface 48 of the mold cavity 50. Forcing the material 52 toward the surface 48 with gas pressure, assists the material 52 in reaching the outer extremities of the mold cavity 50. Since the gas pressure forces the material 52 into these extremities, the material 52 can be injected into the mold 44 at a much lower pressure.

Figure 9:
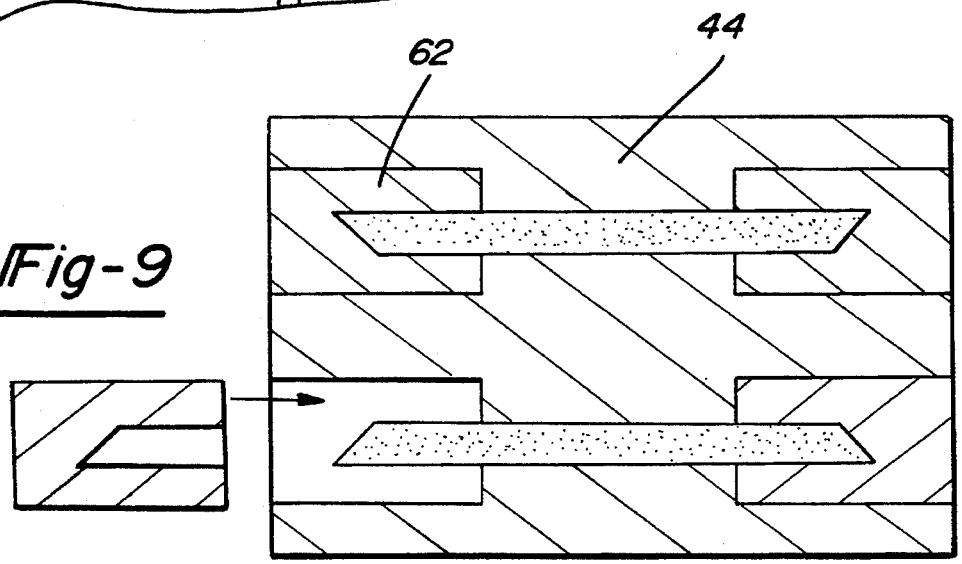
FIG. 9 is a diagrammatic plan view of one portion of a mold of the present invention showing multiple mold cavities for molding multiple parts and further showing mold cavity inserts for modifying the size and shape of the mold cavity and therefore of the particular part being molded.
Figure 10:
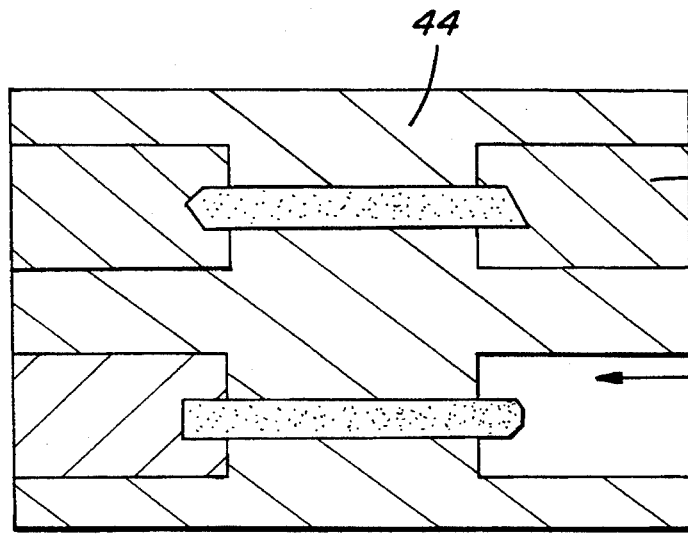
FIG. 10 is a diagrammatic plan view of the mold in FIG. 9 illustrating different inserts in the mold for molding different shaped parts in the same mold.

Even if the mold surface 48 is generally rougher than the show surface 20, this roughness is not reflected on the surface of the trim member and the show surface 20 remains intact. This offers a tremendous advantage over typical trim member molding processes which operate at a very high pressure, and therefore require highly polished mold cavity surfaces. Mold surfaces 48 of the present invention do not require extensive polishing and do not need to be seamless. Accordingly, as shown in FIGS. 9 and 10, the process of the present invention can utilize a mold 44 that has been adapted to accommodate inserts 62 which create seams in the mold cavity surface 48. The inserts are mounted to the mold 44 such that the size and shape of the mold cavity 50 is modified. Since the seams do not affect the show surface 20 on the trim member, a variety of differently configured trim members can be molded without creating imperfections, such as flash lines on the show surface 20. Thus, the mold 44 can accommodate the replacement of inserts 62 with new inserts 62' which define new mold cavity end configurations and/or cavity lengths without the problem of surface imperfections or the like. It will be readily appreciated that the costs of the tooling involved would be substantially reduced by the present process.

An additional advantage of lowering injection material pressure is a corresponding reduction in clamping pressure for holding the mold 44 closed. The ability to lower clamping pressure results in two very important advantages: mold equipment can be downsized, or alteratively, clamping pressure can be kept high, allowing multiple cavities 50 to be provided in the mold 44 such that multiple parts can be simultaneously molded.

The molding process of the present invention can also be adapted to integrate other parts into the trim member. For example, a decorative member 22, such as a thermoplastically coated polyester strip shown in FIG. 5, can be held in the mold 44 and adhered to the trim member during molding. Preferably, the decorative member 22 is held in the mold 44 by vacuum pressure and is adhered to the trim member by an adhesive, however, one of ordinary skill in the art would recognize numerous other methods for accomplishing the same effect. Another such process involves holding a part, such as the mechanical attaching device 28 shown in FIG. 6, in the mold 44 such that the part is integrally molded into the polymer material 52. As illustrated in FIG. 6, mechanical attaching devices 28 can be molded directly into the backing member 18.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

We claim:

1. A molded composite trim member for attachment upon a vehicle, comprising:

(a) a layer of a first material which, prior to molding, is in the form of an elastic sheet having two sides, a first side having a show surface that is substantially the same before said sheet is placed in a mold and after said trim member is molded such that said sheet forms said layer having said show surface, said elastic sheet being stretchable and formably elastic in said mold for allowing said elastic to conform to said mold; and (b) a backing member made of a thermoplastic material which is injected into a mold cavity defined by a portion of a mold surface and by a second side of said sheet such that said thermoplastic material is superimposed by and thereby attached to said second side of said sheet, wherein said sheet is of a size such that upon attachment to said vehicle said backing member is concealed by said sheet, said backing member providing structural support for said layer.

2. The trim member of claim 1 wherein said trim member is a body side molding.

3. The trim member of claim 1 wherein said trim member includes a metallized film as said show surface.

4. The trim member of claim 1 wherein said backing member made of a thermoplastic material defines cavities disposed within said backing member.

5. The trim member of claim 1 wherein said backing member defines a surface for applying an adhesive thereto such that said backing member, and thereby said trim member, can be rigidly affixed to a vehicle by said adhesive.

6. The trim member of claim 1 wherein said trim member includes mechanical fasteners which depend from said backing member for attaching said backing member, and thereby said trim member, to the vehicle.

7. The trim member of claim 1 wherein said show surface of said sheet is color matched with a vehicle prior to molding of the trim member.

8. The trim member of claim 1 wherein said show surface of said sheet has a finished surface before said sheet is placed in the mold.

9. The trim member of claim 8 wherein said finished surface before said sheet is placed in the mold is maintained during and after molding of the trim member.

10. The trim member of claim 1 wherein said first material is polyvinyl chloride.

11. The trim member of claim 1 wherein said sheet is from about 30 to 35 thousandths of an inch in thickness.

12. The trim member of claim 1 wherein said thermoplastic material is selected from the group consisting of polyvinyl chloride, thermoplastic urethane and thermoplastic olefins.

13. The trim member of claim 1 wherein said thermoplastic material is reinforced by reinforcing means selected from the group consisting of fiberglass, glass beads, lineal fibers, talc, mica and calcium carbonate.

14. The trim member of claim 1 wherein said elastic sheet is an extrusion.

15. The trim member of claim 1 wherein said trim member includes an integral lip member and wherein said lip member conceals a gap formed between said backing member and said vehicle when said trim member is attached to said vehicle.

* * * * *